United States Patent
Cross et al.

(10) Patent No.: US 9,231,964 B2
(45) Date of Patent: Jan. 5, 2016

(54) VULNERABILITY DETECTION BASED ON AGGREGATED PRIMITIVES

(75) Inventors: David B. Cross, Caesarea (IL); Nir Nice, Kfar Vradim (IL)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 12/423,029

(22) Filed: Apr. 14, 2009

(65) Prior Publication Data

US 2010/0263049 A1    Oct. 14, 2010

(51) Int. Cl.
- G06F 11/00 (2006.01)
- H04L 29/06 (2006.01)
- G06F 21/57 (2013.01)

(52) U.S. Cl.
CPC .......... *H04L 63/1416* (2013.01); *G06F 21/577* (2013.01)

(58) Field of Classification Search
USPC ..................................... 726/22; 713/187, 188
See application file for complete search history.

(56) References Cited

U.S. PATENT DOCUMENTS

| | | | |
|---|---|---|---|
| 6,073,036 A | 6/2000 | Heikkinen et al. | |
| 6,487,666 B1 | 11/2002 | Shanklin et al. | |
| 6,525,717 B1 | 2/2003 | Tang | |
| 6,839,850 B1 | 1/2005 | Campbell et al. | |
| 7,030,863 B2 | 4/2006 | Longe et al. | |
| 7,084,760 B2 | 8/2006 | Himberger et al. | |
| 7,096,498 B2 | 8/2006 | Judge | |
| 7,213,260 B2 | 5/2007 | Judge | |
| 8,493,972 B2 | 7/2013 | Gassoway | |
| 2003/0167402 A1* | 9/2003 | Stolfo et al. ................... 713/200 |
| 2004/0117478 A1 | 6/2004 | Triulzi et al. | |
| 2004/0260945 A1 | 12/2004 | Raikar et al. | |
| 2005/0262556 A1* | 11/2005 | Waisman et al. ............... 726/22 |
| 2008/0016570 A1 | 1/2008 | Capalik | |
| 2008/0047009 A1 | 2/2008 | Overcash et al. | |
| 2008/0086776 A1 | 4/2008 | Tuvell et al. | |
| 2008/0109871 A1* | 5/2008 | Jacobs ............................. 726/1 |
| 2008/0301810 A1 | 12/2008 | Lehane et al. | |
| 2008/0316183 A1 | 12/2008 | Westerman et al. | |

(Continued)

FOREIGN PATENT DOCUMENTS

| | | |
|---|---|---|
| KR | 19990048401 A | 7/1995 |
| KR | 20090017886 A | 2/2009 |
| WO | 2008001972 A1 | 1/2008 |

OTHER PUBLICATIONS

Young G. , "Management Update: The Future of Intrusion Prevention, Going Beyond Detection", Retrieved at<<http://www.rel.co.il/UserFiles/File/REL/Mcafee/Mcafee%20IPS/Gartner%20IPS%20Report.pdf>>, Oct. 13, 2004, pp. 14.

(Continued)

*Primary Examiner* — Christopher Brown
(74) *Attorney, Agent, or Firm* — Aneesh Mehta; Sandy Swain; Micky Minhas

(57) ABSTRACT

Methods, systems, and computer-readable media are disclosed for detecting vulnerabilities based on aggregated primitives. A particular method includes receiving a plurality of data transmissions. At least one of the data transmissions includes a protocol anomaly that is not indicative of a security threat. The method includes identifying a plurality of primitives associated with the data transmissions. The primitives are aggregated, and an attack condition is identified based on the aggregated primitives. A security alert is generated based on the identified attack condition.

20 Claims, 10 Drawing Sheets

(56) References Cited

U.S. PATENT DOCUMENTS

| | | | |
|---|---|---|---|
| 2009/0038015 A1 | 2/2009 | Diamant et al. | |
| 2010/0115617 A1* | 5/2010 | Weber et al. | 726/23 |

OTHER PUBLICATIONS

"Cisco Adaptive Wireless Intrusion Prevention System", Retrieved at<<http://www.cisco.com/en/US/prod/collateral/wireless/ps9733/ps9817/data_sheet_c78-501388.pdf>>, pp. 1-8.

Raja Sanjay, "Network Intrusion Prevention Systems—Why "Always On" Stateful Inspection and Deep Packet Analysis are Essential to Deliver Non-Stop Protection", Retrieved at<<http://www.toplayer.com/generic/TLN_Stateful_WP.pdf>>, Jan. 26, 2005, pp. 12.

Wang, et al., "A Generic Application-Level Protocol Analyzer and its Language", Retrieved at<<http://www.cs.cmu.edu/~dbrumley/pubs/gapa-ndss-07.pdf>>, pp. 1-13.

Sekar, R., "A High Performance Network Intrusion Detection System," Retrieved at <<http://www.seclab.cs.sunysb.edu/seclab/pubs/ccs99.pdf>>, pp. 1-10.

Core Security Technologies, "Snort TCP Stream Reassembly Integer Overflow Vulnerability", Retrieved at <<http://www.coresecurity.com/content/snort-tcp-stream-reassembly-integer-overflow-vulnerability>>, pp. 1-3.

"International Preliminary Report" from the International Bureau (WIPO for International Application No. PCT/US2010/025960, Date Mailed: Oct. 6, 2011, International Filing Date: Mar. 2, 2010, pp. 5.

Notice on the First Office Action received from the State Intellectual Property Office of the Peoples's Republic of China, for Application No: 201080014026.1, dated Dec. 5, 2012, with English translation, 12 pages.

Notice on the Second Office Action received from the State Intellectual Property Office of the Peoples's Republic of China, for Application No: 201080014026.1, dated Jul. 12, 2013, with English translation, 12 pages.

Notice on the Third Office Action received from the State Intellectual Property Office of the Peoples's Republic of China, for Application No: 201080014026.1, dated Jan. 13, 2014, with English translation, 11 pages.

Borisov, N., et al. "A Generic Application-Level Protocol Analyzer and its Language", NDSS, 2007, Microsoft Research, Redmond, Washington, pp. 1-13.

* cited by examiner

VULNERABILITY DETECTION BASED ON AGGREGATED PRIMITIVES

BACKGROUND

Information Technology (IT) professionals and IT departments often use a management and monitoring system in an effort to maintain a stable and secure computing environment. Monitoring systems frequently include tools to monitor network traffic, such as Internet traffic, for known security threats.

The network traffic monitoring systems used by IT professionals commonly include an intrusion detection system (IDS) and an intrusion prevention system (IPS). IDSs and IPSs track the flow of network traffic in and out of a computing environment and compare the tracked network traffic to a specific set of rules (e.g., virus definitions or signatures of known security exploits) to identify attacks. As a result, whether or not a particular attack is identified depends on whether or not a rule that contains a known virus definition or a known security exploit signature exists for the particular attack. Consequently, new or unknown attacks may not be detected or prevented by IDSs and IPSs.

SUMMARY

The present disclosure describes system to detect vulnerabilities based on primitive aggregation. The system uses pattern detection techniques and statistical analysis to detect not only ongoing attacks, but also future attacks, potential exploits, and potential vulnerabilities. The system is capable of identifying security risks based on unrelated data transmissions as well as individual anomalous data transmissions that do not trigger a security response on their own.

The vulnerability detection system may be host based, distributed, or gateway-based. Data transmissions received by the system are translated into low-level language primitives (e.g., characters, strings, integers, floating point numbers, and pointers) and high-level typed primitives (e.g., templated data structures and user-defined classes). The primitives are then aggregated and compared to meta language policies that include definitions of potentially suspicious activity. The aggregation and analysis of the primitives may occur in real-time, near-real time, asynchronously, or offline. When a match is found between the aggregated primitives and a policy, a security alert may be generated or an enforcement action may be triggered.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a system is disclosed that includes an interface configured to receive a plurality of data transmissions at a computer. The system also includes a translation module configured to identify at least one primitive associated with each of the data transmissions. The system further includes an aggregation module configured to aggregate each of the data transmissions including aggregating the at least one primitive associated with each of the data transmissions to generate aggregated primitives. The system includes an analysis module configured to generate an analysis output identifying a match between the aggregated primitives and a policy. The system also includes an enforcement module configured to generate a security alert based on the analysis output.

In another particular embodiment, a method is disclosed that includes receiving a plurality of data transmissions. At least one of the data transmissions includes a protocol anomaly that is not indicative of a security threat. The method also includes identifying a plurality of primitives associated with the data transmissions. The method further includes aggregating the plurality of primitives. The method includes identifying an attack condition based on the aggregated primitives and generating a security alert based on the identified attack condition.

In another particular embodiment, a computer-readable medium is disclosed that includes instructions, that when executed by a computer, cause the computer to receive a plurality of anomalous data transmissions. Each of the anomalous data transmissions does not individually trigger a security response. The computer-readable medium also includes instructions, that when executed by the computer, cause the computer to identify one or more primitives associated with each of the anomalous data transmissions. The computer-readable medium further includes instructions, that when executed by the computer, cause the computer to aggregate the one or more primitives associated with each of the anomalous data transmissions. The computer-readable medium includes instructions, that when executed by the computer, cause the computer to identify an attack condition based on the aggregated primitives and trigger to an action based on the identified attack condition.

Figure 1:
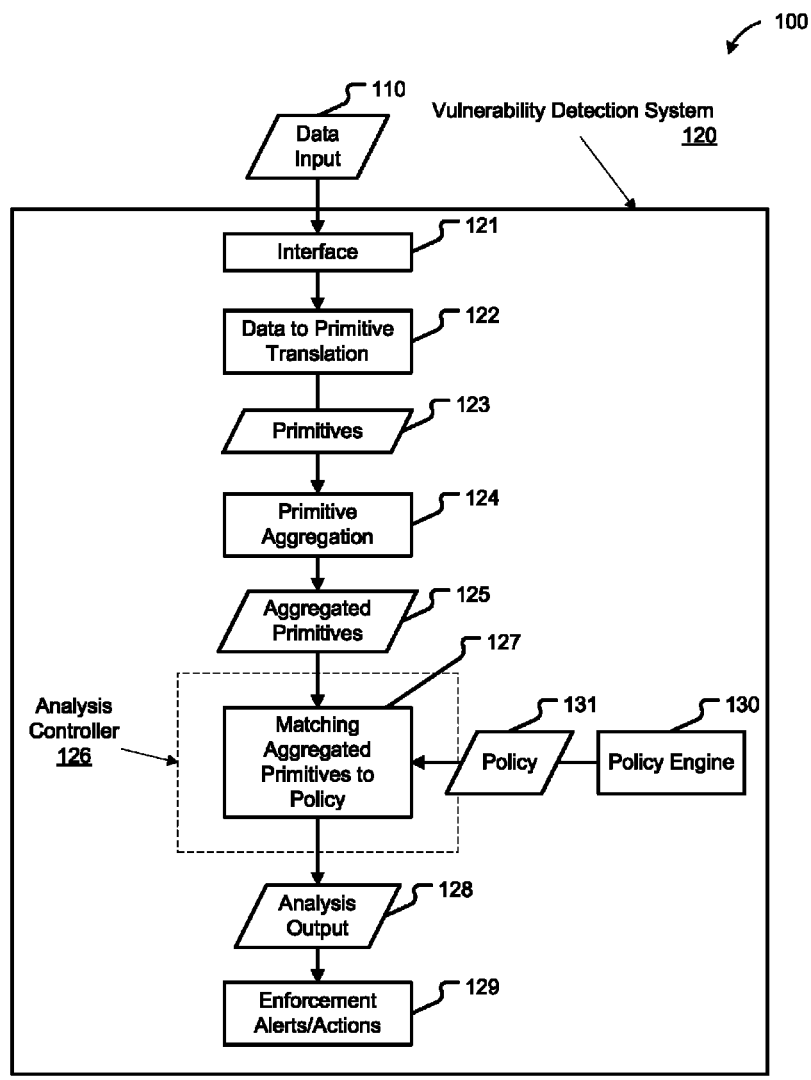
FIG. 1 is a block diagram to illustrate data flow through a particular embodiment of a vulnerability detection system.

FIG. 1 is a block diagram 100 that illustrates data flow through a particular embodiment of a vulnerability detection system 120.

The vulnerability detection system 120 is configured to receive a plurality of data inputs, such as a data input 110, via an interface 121. In a particular embodiment, the interface 121 is a network interface, such as a wired or wireless network interface. In such an embodiment, the data input 110 includes data transmissions transmitted over a network protocol, such as hypertext transfer protocol (HTTP), hypertext transfer protocol secure (HTTPS), simple mail transfer protocol (SMTP), Internet message access protocol (IMAP), post office protocol (POP), domain name system (DNS), or simple object access protocol (SOAP). It should be noted that the previous list of protocols is by way of illustration only and not limitation. In another particular embodiment, the data input 110 is received via a network, such as a local area network (LAN), wide area network (WAN), or the Internet. The interface 121 is configured to send the received data input 110 to a data to primitive translation unit 122.

In a particular embodiment, each of the data inputs received at the interface 121 may include an anomaly. For example, the data input 110 may include a protocol anomaly. Protocol anomalies include, but are not limited to, a data structure overflow, a missing expected data structure, an invalid data value, an improper sequence of numbers, an out of order message, or a name mismatch.

The data to primitive translation unit 122 is configured to receive the data input 110 from the interface 121 and to translate the data input 110 into one or more primitives 123. The one or more primitives 123 may include low-level primitives such as a character, a string, a short integer, a long integer, a floating-point, a boolean, a reference or a pointer, or a high-level primitive such as an array, a structure, a vector, a list, a hash, a set, a heap, a map, or a user-defined class (e.g., a templated class). The data to primitive translation unit 122 is also configured to send the one or more primitives 123 to a primitive aggregation unit 124.

The primitive aggregation unit 124 is configured to receive primitives for a plurality of data inputs and to aggregate the received primitives to generate aggregated primitives 125. For example, the primitive aggregation unit 124 may receive the one or more primitives 123 associated with the data input 110 and add the one or more primitives 123 to generate the aggregated primitives 125. In a particular embodiment, the primitive aggregation unit 124 aggregates primitives as they are received. In another particular embodiment, the primitive aggregation unit 124 stores received primitives and then aggregates the received primitives asynchronously from the operation of the interface 121 and the data to primitive translation unit 122. The primitive aggregation unit 124 is also configured to send the aggregated primitives 125 to an analysis controller 126.

The analysis controller 126 is configured to receive the aggregated primitives 125 from the primitive aggregation unit 124. The analysis controller 126 is also configured to receive a policy 131 from a policy engine 130. The policy 131 may include a definition of suspicious or questionable activity. In a particular embodiment, the policy 131 is defined in a meta language, such as an extensible markup language (XML), a binary representation, or a generic application level protocol analyzer language (GAPAL). In another particular embodiment, the policy 131 does not include information related to a known malware, known security exploit, or a known vulnerable data structure. For example, the policy 131 may be defined in a meta language and indicate that data transmissions with arguments that represent an increasing value when the arguments are converted to double words and stored in an array may indicate malicious activity (e.g., an attempt to trigger an overflow condition). It should be noted that in this case, the individual data transmission arguments would not have triggered a security response since each of the individual arguments may have been within acceptable parameters. The analysis controller 126 includes a unit for matching aggregated primitives to policy 127 that is configured to generate an analysis output 128 based on a comparison between the aggregated primitives 125 and the policy 131. The analysis controller 126 is also configured to send the analysis output 128 to an enforcement alerts/actions unit 129.

The enforcement alerts/actions unit 129 is configured to receive the analysis output 128 from the analysis controller 126. The enforcement alerts/actions unit 129 is also configured to generate security alerts and take security actions. For example, when the analysis output 128 indicates a detected vulnerability, the enforcement alerts/actions unit 129 may generate and send a security alert identifying the detected vulnerability or may take preventive actions (e.g., blocking future data transmissions at the interface 121) to remedy the detected vulnerability.

In operation, the interface 121 receives a plurality of data inputs, such as the data input 110. The plurality of data inputs may be related or unrelated to each other. Each of the plurality of data inputs may also include a protocol anomaly that is not indicative of a security threat or vulnerability. Each data input received by the interface 121 is sent to the data to primitive translation unit 122, where the received data input is translated into one or more primitives. For example, the data input 110 may be translated into one or more primitives 123 by the data to primitive translation unit 122. The one or more primitives 123 may then be sent to the primitive aggregation unit 124, where the one or more primitives 123 are aggregated with primitives generated from previously received data inputs to form the aggregated primitives 125.

The aggregated primitives 125 are sent from the primitive aggregation unit 124 to the analysis controller 126. The unit for matching aggregated primitives to policy 127 matches the aggregated primitives 125 with one or more policies from the policy engine 130. For example, the aggregated primitives 125 may be compared with the policy 131. Based on the results of the comparison, the analysis controller 126 generates the analysis output 128 and sends the analysis output 128 to the enforcement alerts/actions unit 129. For example, when the analysis output 128 indicates that suspicious activity or a vulnerability has been detected, the enforcement arts/actions unit 129 may generate a security alert or take preventive actions.

It will be appreciated that the vulnerability detection system 120 of FIG. 1 may be used to detect suspicious activity or vulnerabilities even when the data inputs indicative of the suspicious activity or vulnerability are unrelated (e.g., received intermittently over a period of time). It will further be appreciated that the vulnerability detection system 120 of FIG. 1 may detect previously unknown vulnerabilities, since the policy 131 may not include information that identifies or defines a particular known security exploit or known malware. Thus, IT administrators deploying the vulnerability detection system 120 of FIG. 1 may define generic application use cases instead of or in addition to defining known exploit or vulnerability signatures in security policies. It will also be appreciated that the vulnerability detection system 120 of FIG. 1 may detect a vulnerability based on aggregated anomalous data inputs even when each of the individual anomalies are within acceptable parameters (e.g., do not match a policy), do not indicate a security threat, and do not trigger a security response. Therefore, the vulnerability detection system 120 of FIG. 1 may prevent or detect viruses or security exploits that are in development, because although a signature of the new virus or security exploit is not known, aggregated primitives based on the new virus or security exploit may match policies based on generic application use cases.

Figure 2:
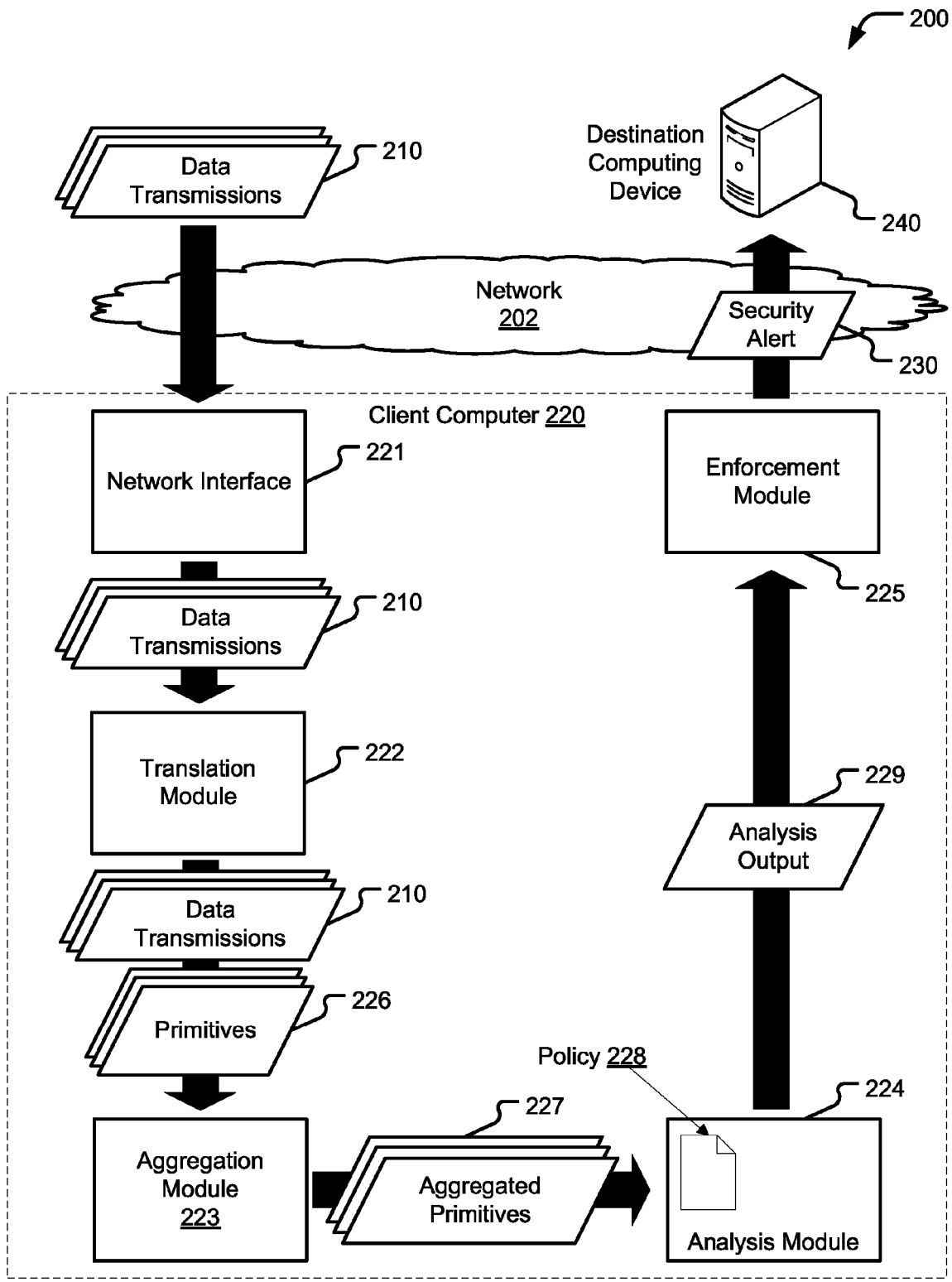
FIG. 2 is a block diagram of a particular embodiment of a host-based vulnerability detection system.

FIG. 2 is a block diagram 200 of a particular embodiment of a host-based vulnerability detection system at a client computer 220. The client computer 220 is communicatively coupled to a plurality of destination devices, such as a destination computing device 240, via a network 202.

The client computer 220 may be configured to receive a plurality of data transmissions 210 via the network 202. The plurality of data transmissions 210 may be received at a network interface 221 of the client computer 220. The network interface 221 may be configured to send the received data transmissions 210 to a translation module 222. The data transmissions 210 may be related or unrelated to each other. Each of the data transmissions 210 may also include a protocol anomaly that is not individually indicative of a security threat or vulnerability. In a particular embodiment, the data transmissions are sent to the translation module 222 as the data transmissions 210 are received by the network interface 221. Alternatively, the network interface 221 may store each individual data transmission and send the individual data transmissions to the translation module 222 in batches (e.g., periodically). In an illustrative embodiment, the network interface 221 includes the interface 121 of FIG. 1.

The translation module 222 may be configured to receive the data transmissions 210 from the network interface 221 and translate the data transmissions 210 into one or more primitives 226. The translation module 222 may also be configured to send the data transmissions 210 and the one or more primitives 226 to an aggregation module 223. For example, when the data transmissions 210 are network messages, the translation module 222 may translate the message payloads of the network messages into low-level primitives (e.g., double words) or high-level primitives (e.g., arrays). In an illustrative embodiment, the translation module 222 includes the data to primitive translation unit 122 of FIG. 1.

The aggregation module 223 may be configured to receive the data transmissions 210 and the one or more primitives 226 from the translation module 222. The aggregation module 223 may also be configured to aggregate the one or more primitives 226, to form aggregated primitives 227, and to send the aggregated primitives 227 to an analysis module 224. For example, when the primitives 226 are strings, the aggregation module 223 may aggregate the strings to form an aggregated primitive that is a sequence of strings resembling a file. In an illustrative embodiment, the aggregation module 223 includes the primitive aggregation unit 124 of FIG. 1.

The analysis module 224 may be configured to receive the aggregated primitives 227 from the aggregation module 223 and to compare the aggregated primitives 227 to a policy 228. The policy 228 may include a definition of suspicious activity that may be indicative of a future attack. The analysis module 224 may further be configured to send an analysis output 229 to an enforcement module 225, where the analysis output 229 is based on the comparison of the aggregated primitives 227 and the policy 228. For example, the analysis output 229 may indicate whether or not a match was found between the aggregated primitives 227 and the policy 228. It should be noted that although the particular embodiment illustrated in FIG. 2 depicts a single policy, the analysis output 229 may also be based on a comparison of the aggregated primitives 227 to multiple policies. In an illustrative embodiment, the analysis module 224 includes the analysis controller 126 of FIG. 1.

In a particular embodiment, the analysis module 224 may generate one or more unique triggers based on the aggregated primitives 227 and the policy 228. In such an embodiment, the analysis module 224 may subsequently correlate such triggers to identify a single event or security compromise.

The enforcement module 225 may be configured to receive the analysis output 229 from the analysis module 224 and to generate a security alert 230 based on the analysis output 229. For example, the enforcement module 225 may generate the security alert 230 when the analysis output 229 indicates that a security compromise has been detected at the client computer 220. The enforcement module 225 may also be configured to send the security alert 230 to other devices, such as the destination computing device 240, to notify the other devices of the detected security compromise. In a particular embodiment, the security alert 230 is sent via the network 202. In an illustrative embodiment, the enforcement module 225 includes the enforcement alerts/actions unit 129 of FIG. 1.

It will be appreciated that the host-based vulnerability detection system of FIG. 2 is located at a single client computer (e.g., the client computer 220). A host-based vulnerability system may detect and respond to vulnerabilities more rapidly (e.g., real-time or near real-time) than a distributed system, due to the avoidance of latencies that may be associated with inter-component communication in the distributed system. It will also be appreciated that the client computer 220 may warn other computing devices about a detected vulnerability. For example, when the client computer 220 is part of or connected to a corporate network, the client computer 220 may warn other computers in the corporate network about a security threat, so that the other computers may take preventive measures to protect against the security threat.

It will further be appreciated that the host-based vulnerability detection system of FIG. 2 may also use statistical analysis to identify a security threat. For example, the system of FIG. 2 may determine the identity of a specific source of one or more of the data transmissions 210 and then calculate a frequency (e.g., 5 transmissions per minute) of anomalous data transmissions from the specific source. When the frequency of anomalous data transmissions from the specific source exceeds a threshold (e.g., a threshold included in the policy 228), the analysis module 224 may identify an ongoing network-based attack originating from the specific source.

Figure 3:
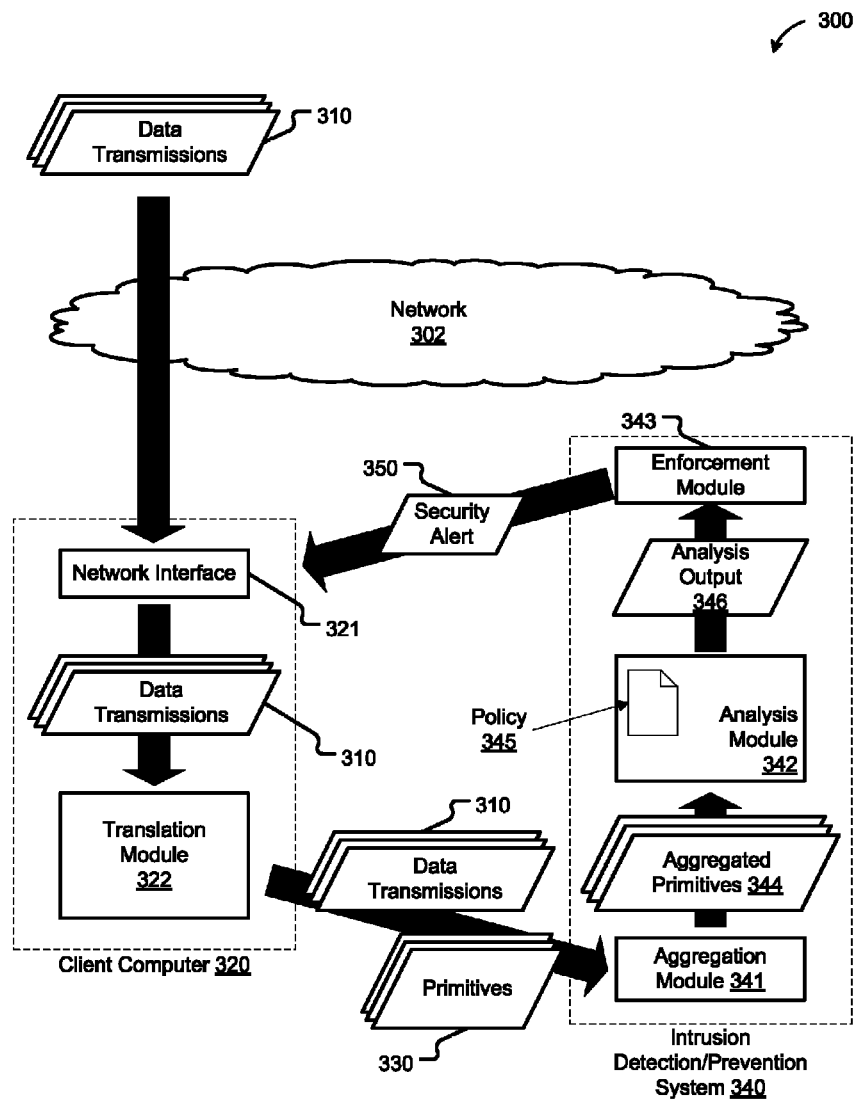
FIG. 3 is a block diagram of a particular embodiment of a distributed vulnerability detection system.

FIG. 3 is a block diagram 300 of a particular embodiment of a distributed vulnerability detection system. In the particular example illustrated in FIG. 3, the vulnerability detection system is distributed across a client computer 320 and an intrusion detection/prevention system (IDS/IPS) 340. The client computer 320 is communicatively coupled to the IDS/IPS 340. The client computer 320 is also configured to receive a plurality of data transmissions 310 via a network 302. In a particular embodiment, the IDS/IPS 340 is communicatively coupled to a plurality of client computers, including the client computer 320.

The client computer 320 may be configured to receive the plurality of data transmissions 310 at the network interface 321 of the client computer 320. The data transmissions 310 may be related or unrelated to each other. Each of the data transmissions may also include a protocol anomaly that is not individually indicative of a security threat or vulnerability. The network interface 321 may be configured to send the received data transmissions 310 to a translation module 322. In an illustrative embodiment, the network interface 321 includes the interface 121 of FIG. 1 or the network interface 221 of FIG. 2.

The translation module 322 may be configured to receive the data transmissions 310 from the network interface 321 and translate the data transmissions 310 into one or more primitives 330. The translation module 222 may also be configured to send the data transmissions 310 and the one or more primitives 330 to the IDS/IPS 340. In an illustrative embodiment, the translation module 322 includes the data to primitive translation unit 122 of FIG. 1 or the translation module 222 of FIG. 2.

The IDS/IPS 340 may include an aggregation module 341 configured to receive the data transmissions 310 and the one or more primitives 330 from the client computer 320. The aggregation module 341 may also be configured to aggregate the one or more primitives 330, to form the aggregated primitives 344, and to send the aggregated primitives 344 to an analysis module 342. In an illustrative embodiment, the aggregation module 341 includes the primitive aggregation unit 124 of FIG. 1 or the aggregation module 223 of FIG. 2.

The analysis module 342 of the IDS/IPS 340 is configured to receive the aggregated primitives 344 from the aggregation module 341 and to compare the aggregated primitives 344 to one or more policies, such as a policy 345. The policy 345 may include a definition of suspicious activity that may be indicative of a further attack. The analysis module 342 may further be configured to send an analysis output 346 to an enforcement module 343, where the analysis output 346 is based on the comparison of the aggregated primitives 344 and the policy 345. In an illustrative embodiment, the analysis module 342 includes the analysis controller 126 of FIG. 1 or the analysis module 224 of FIG. 2.

The enforcement module 343 at the IDS/IPS 340 may be configured to receive the analysis output 346 from the analysis module 342 and to selectively generate a security alert 350 based on the analysis output 346. For example, the enforcement module 343 may generate the security alert 350 when the analysis output 346 indicates that a security threat has been detected based on the data transmissions 310 and primitives 330 from the client computer 320. The enforcement module 343 may also be configured to send the security alert 350 to the client computer 320. In an illustrative embodiment, the enforcement module 343 includes the enforcement alerts/actions unit 129 of FIG. 1 or the enforcement module 225 of FIG. 2.

It will be appreciated that the distributed vulnerability detection system of FIG. 3 is distributed across multiple components (e.g., the client computer 320 and an IDS/IPS 340). This may simplify processing logic at client computers, because client computers may rely on the IDS/IPS to perform primitive aggregation, conduct security analysis, and make enforcement decisions. It will also be appreciated that the IDS/IPS 340 may warn the client computer 320 of a security threat detected based on data transmissions 310 received by the client computer. The client computer 320 may then take preventive measures based on the warning. For example, the client computer 320 may change the behavior of one or more applications at the client computer (e.g., close a network port opened by a particular application). As another example, the client computer 320 may block subsequent data transmissions from one or more sources (e.g., remote attackers) of the initial data transmissions 310.

Figure 4:
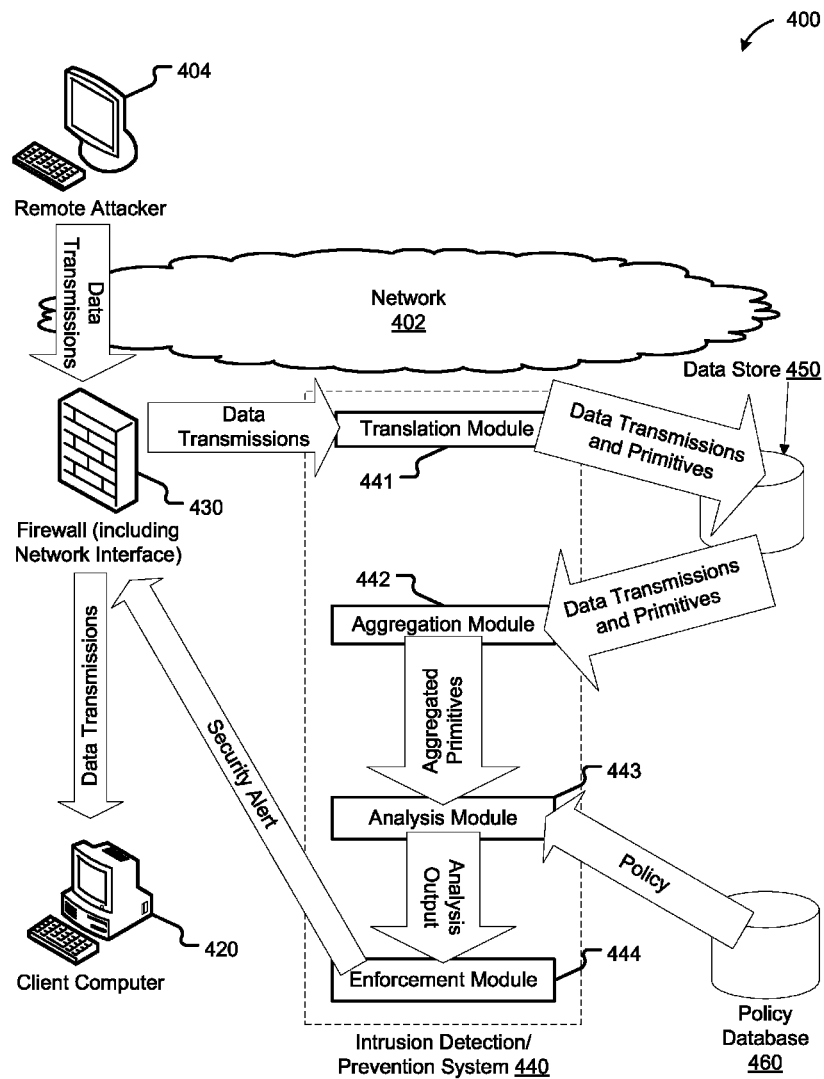
FIG. 4 is a block diagram of a particular embodiment of a gateway-based vulnerability detection system.

FIG. 4 is a block diagram of a particular embodiment of a gateway-based vulnerability detection system 400. In the particular example illustrated in FIG. 4, the vulnerability detection system 400 includes a firewall 430 that serves as a network traffic gateway between a client computer 420 and a network 402. The vulnerability detection system 400 also includes an intrusion detection/prevention system (IDS/IPS) 440 communicatively coupled to the firewall 430, a data store 450, and a policy database 460.

The firewall 430 may be configured to receive data transmissions at a network interface of the firewall 430. Based on the contents of the data transmissions, the firewall 430 may allow the data transmissions to "pass through" to the client computer 420. The firewall 430 may also send the data transmissions to the IDS/IPS 440 for analysis. In an illustrative embodiment, the firewall 430 may include the interface 121 of FIG. 1, the network interface 221 of FIG. 2, or the network interface 321 of FIG. 3.

It should be noted that although the particular embodiment illustrated in FIG. 4 depicts a firewall, the gateway-based vulnerability detection system 400 of FIG. 4 may instead include intermediary devices other than hardware or software firewalls.

The IDS/IPS 440 may include a translation module 441 configured to receive data transmissions from the firewall 430 and to translate data transmissions into one or more primitives associated with the data transmissions. The translation module 441 may also be configured to send the data transmissions and the one or more primitives to the data store 450. The data store 450 may be a database, a disk, or other storage device. In an illustrative embodiment, the translation module 441 includes the data to primitive translation unit 122 of FIG. 1, the translation module 222 of FIG. 2, or the translation module 322 of FIG. 3.

The IDS/IPS 440 may also include an aggregation module 442 configured to retrieve data transmissions and primitives from the data store 450. The aggregation module 442 may also be configured to aggregate data transmissions and primitives that are retrieved from the data store 450 and to send resulting aggregated primitives to an analysis module 443. In an illustrative embodiment, the aggregation module 442 includes the primitive aggregation unit 124 of FIG. 1, the aggregation module 223 of FIG. 2, or the aggregation module 341 of FIG. 3.

The analysis module 443 of the IDS/IPS 440 may be configured to receive aggregated primitives from the aggregation module 442 and to analyze the aggregated primitives by comparing the aggregated primitives to one or more policies. In a particular embodiment, the analysis module 443 retrieves such policies from the policy database 460. The analysis module 443 may further be configured to send an analysis output to an enforcement module 444, where the analysis output is based on the comparison of the aggregated primitives and one or more policies from the policy database 460. The policy database 460 may be updated and maintained independently of the IDS/IPS 440. In an illustrative embodiment, the analysis module 443 includes the analysis controller 126 of FIG. 1, the analysis module 224 of FIG. 2, or the analysis module 342 of FIG. 3.

The enforcement module 444 at the IDS/IPS 440 may be configured to receive analysis output from the analysis module 443 and to generate security alerts based on the analysis output. For example, the enforcement module 444 may generate a security alert when the analysis output from the analysis module 443 indicates that a security threat has been detected based on data transmissions received from the firewall 430. The enforcement module 444 may also be configured to send the security alert to the firewall 430. In an illustrative embodiment, the enforcement module 444 includes the enforcement alerts/actions unit 129 of FIG. 1, the enforcement module 225 of FIG. 2, or the enforcement module 343 of FIG. 3.

It will be appreciated that the gateway-based vulnerability detection system 400 of FIG. 4 may enable asynchronous or offline aggregation and analysis of primitives. That is, because data transmissions and primitives are stored in a data store (e.g., the data store 450), the IDS/IPS 440 may choose when to aggregate and analyze the data transmissions and primitives (i.e., asynchronously from the operation of the firewall), including times when the firewall 430 is disconnected from the network (i.e., offline).

Figure 5:
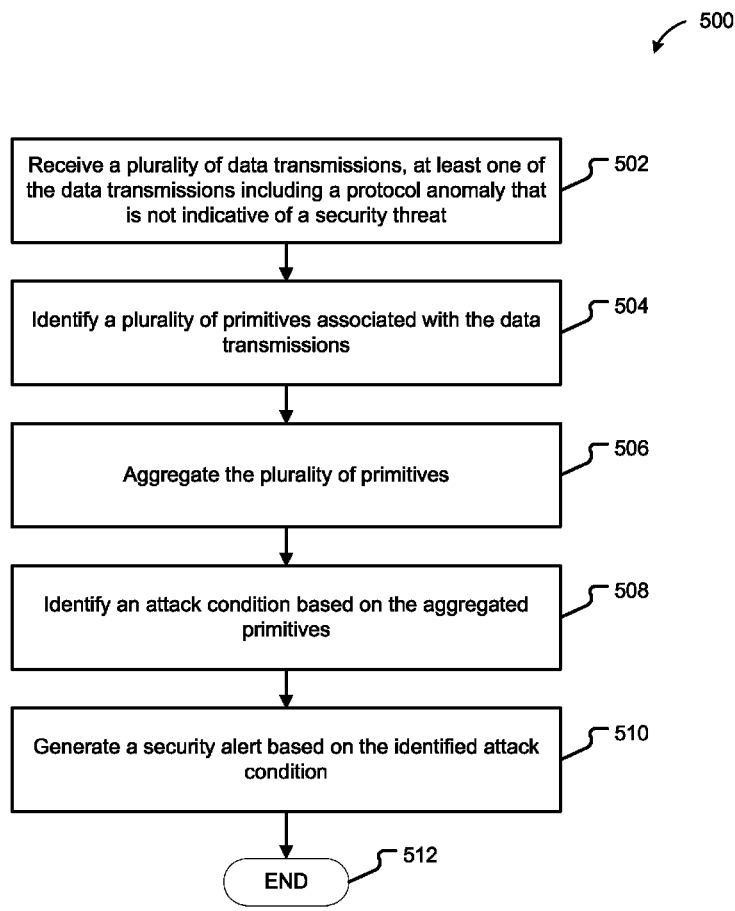
FIG. 5 is a flow diagram to illustrate a particular embodiment of a method of vulnerability detection.

FIG. 5 is a flow diagram to illustrate a particular embodiment of a method 500 of vulnerability detection. In an illustrative embodiment, the method 500 of FIG. 5 may be performed by the vulnerability detection system 120 of FIG. 1. In another illustrative embodiment, the method 500 of FIG. 5 may be performed by the client computer 220 of FIG. 2. In another illustrative embodiment, the method 500 of FIG. 5 may be performed by the client computer 320 of FIG. 3 and the IDS/IPS 340 of FIG. 3. In another illustrative embodiment, the method 500 of FIG. 5 may be performed by the firewall 430 of FIG. 4 and the IDS/IPS 440 of FIG. 4.

The method 500 includes receiving a plurality of data transmissions, at 502. At least one of the data transmissions includes a protocol anomaly that is not indicative of a security threat. For example, in FIG. 2, the client computer 220 may receive the data transmissions 210.

The method 500 also includes identifying a plurality of primitives associated with the data transmissions, at 504. For example, in FIG. 2, the translation module 222 may translate the data transmissions 210 into the primitives 226.

The method 500 further includes aggregating the plurality of primitives, at 506. For example, in FIG. 2, the aggregation module 223 may aggregate the primitives 226 to form the aggregated primitives 227.

The method 500 includes identifying an attack condition based on the aggregated primitives, at 508. For example, in FIG. 2, the analysis module 224 may identify an attack condition based on a match between the aggregated primitives 227 and the policy 228.

The method 500 also includes generating a security alert based on the identified attack condition, at 510. For example, in FIG. 2, the enforcement module 225 may generate the security alert 230 based on the analysis output 229, where the analysis output 229 indicates the attack condition identified by the analysis module 224. The method 500 ends at 512.

It will be appreciated that the method 500 of FIG. 5 may be used to identify vulnerabilities, threats, and attacks based on anomalous data transmissions, even when an individual anomaly in an individual data transmission is within acceptable parameters and not indicative of a security threat.

Figure 6:
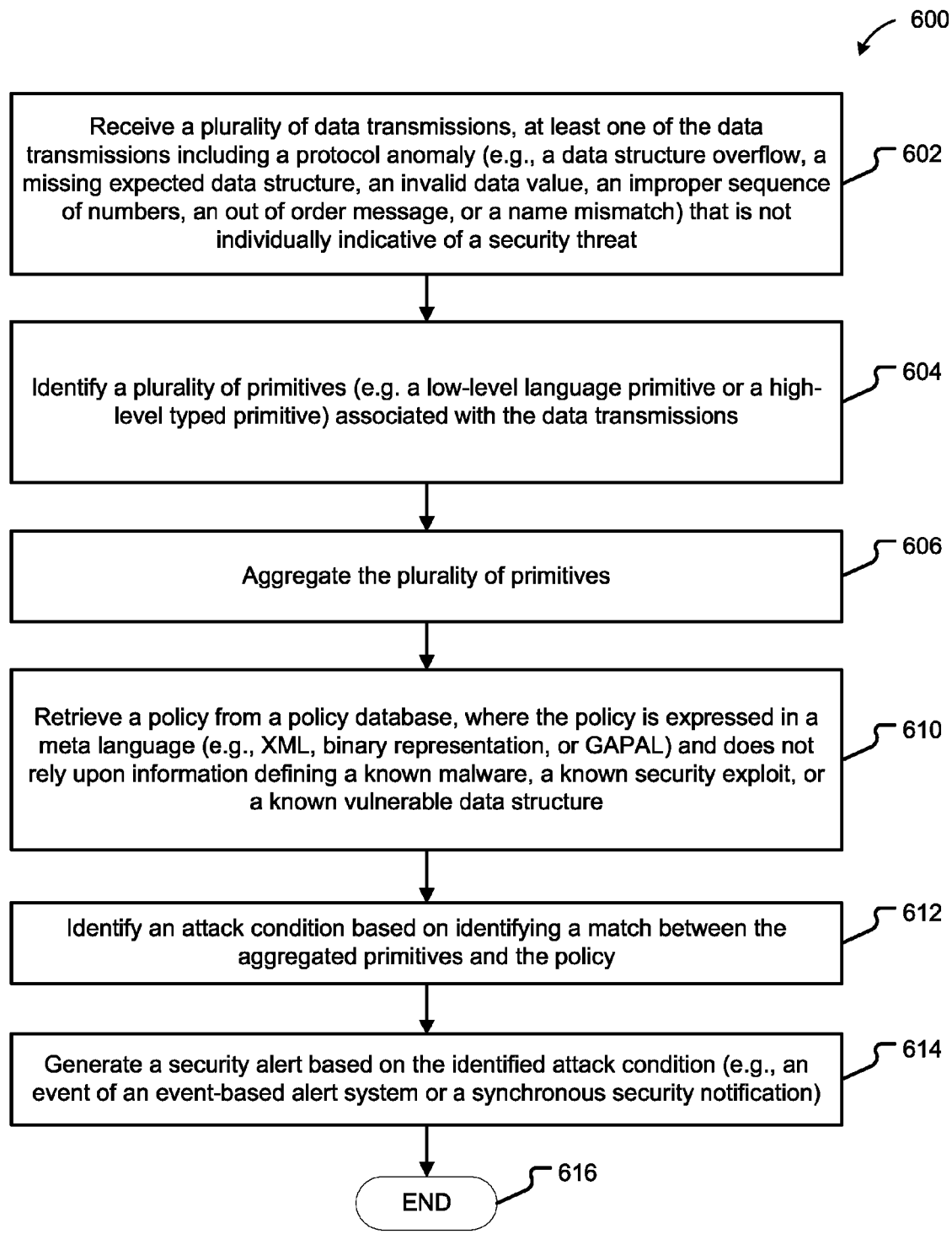
FIG. 6 is a flow diagram to illustrate another particular embodiment of a method of vulnerability detection.

FIG. 6 is a flow diagram to illustrate another particular embodiment of a method 600 of vulnerability detection. In an illustrative embodiment, the method 600 of FIG. 6 may be performed by the vulnerability detection system 120 of FIG. 1. In another illustrative embodiment, the method 600 of FIG. 6 may be performed by the host-based vulnerability detection system of FIG. 2, the distributed vulnerability detection system of FIG. 3, or the gateway-based vulnerability detection system of FIG. 4.

The method 600 includes receiving a plurality of data transmissions, at 602. At least one of the data transmissions may include a protocol anomaly (e.g., a data structure overflow, a missing expected data structure, an invalid data value, an improper sequence of numbers, an out of order message, or a name mismatch) that is not individually indicative of a security threat. For example, in FIG. 4, the firewall 430 may receive data transmissions that include anomalies from the remote attacker 404 via the network 402.

The method 600 also includes identifying a plurality of primitives associated with the data transmissions, at 604. The primitives may include a low level language primitive, such as a character, a string, a short integer, a long integer, a floating-point, a Boolean, a reference, or a pointer. The one or more primitives may also include a high-level typed primitive, such as an array, a structure, a vector, a list, a hash, a set, a heap, a map, or a user-defined class. For example, referring to FIG. 4, the translation module 441 may translate the data transmissions from the remote attacker 404 into one or more primitives.

The method 600 further includes aggregating the plurality of primitives, at 606. For example, referring to FIG. 4, the aggregation module 442 may aggregate the primitives based on the data transmissions from the remote attacker 404, where the primitives include high-level typed primitives (e.g., data structures such as arrays).

The method 600 also includes retrieving a policy from a policy database, at 610. The policy is expressed in a meta language (e.g., XML, binary representation, or GAPAL) and does not rely upon information defining a known malware, a known security exploit, or a known vulnerable data structure. For example, referring to FIG. 4, the analysis module 443 may retrieve a policy from the policy database 460.

The method 600 includes identifying an attack condition based on identifying a match between the aggregated primitives and the policy, at 612. For example, referring to FIG. 4, the analysis module 443 may identify an attack condition based on a match between the aggregated primitives and the policy retrieved from the policy database 460.

The method 600 also includes generating a security alert based on the identified attack condition, at 614. The security alert may be an event of an event-based alert system or a synchronous security notification. For example, referring to FIG. 4, the enforcement module 444 may generate a security alert based on analysis output from the analysis module 443. The method 600 ends at 616.

It will be appreciated that the method 600 of FIG. 6 may provide vulnerability detection based on policies expressed in a variety of languages (e.g., XML, binary representation, or GAPAL). It will also be appreciated that the method 600 of FIG. 6 may be used with a variety of security systems (e.g., event-based alert systems or synchronous alert systems).

Figure 7:
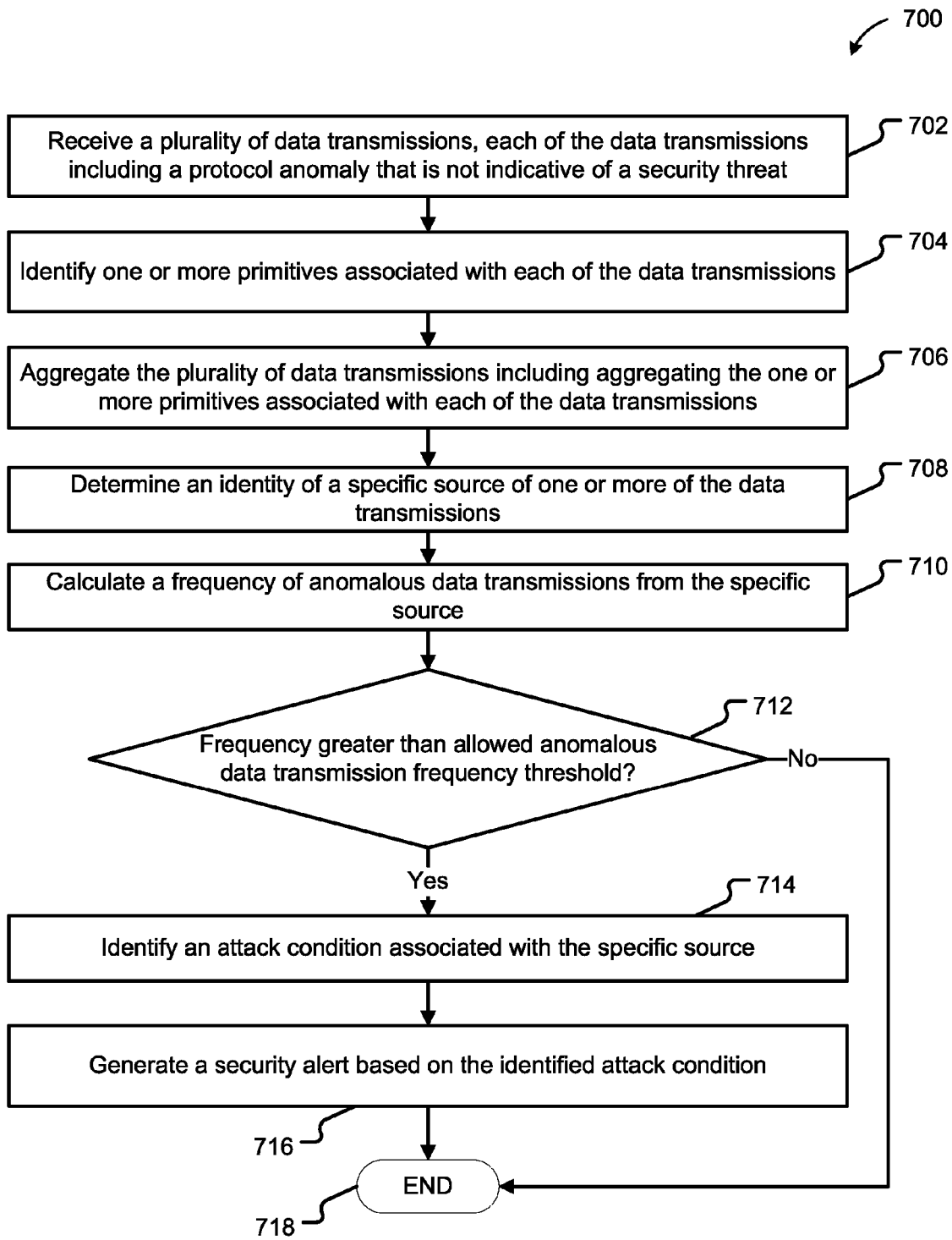
FIG. 7 is a flow diagram to illustrate another particular embodiment of a method of vulnerability detection.

FIG. 7 is a flow diagram to illustrate another particular embodiment of a method 700 of vulnerability detection. In an illustrative embodiment, the method 700 of FIG. 7 may be performed by the vulnerability detection system 120 of FIG. 1. In another illustrative embodiment, the method 700 of FIG. 7 may be performed by the host-based vulnerability detection system of FIG. 2, the distributed vulnerability detection system of FIG. 3, or the gateway-based vulnerability detection system of FIG. 4.

The method 700 includes receiving a plurality of data transmissions, at 702. Each of the data transmissions may include a protocol anomaly that is not indicative of a security threat. For example, referring to FIG. 2, the client computer 220 may receive the data transmissions 210.

The method 700 also includes identifying one or more primitives associated with each of the data transmissions, at 704. For example, referring to FIG. 2, the translation module 222 may translate the data transmissions 210 into the primitives 226.

The method 700 further includes aggregating the plurality of data transmissions, including aggregating the one or more primitives associated with each of the data transmissions, at 706. For example, referring to FIG. 2, the aggregation module 223 may aggregate the data transmissions 210, including aggregating the primitives 226 to form the aggregated primitives 227.

The method 700 includes determining an identity of a specific source of one or more of the data transmissions. For example, referring to FIG. 2, the identity of a specific source of one or more of the data transmissions 210 may be determined by the network interface 221. In an illustrative embodiment, the specific source is a remote attacker, such as the remote attacker 404 of FIG. 4.

The method 700 also includes calculating a frequency of anomalous data transmissions from the specific source, at 710. For example, referring to FIG. 2, the analysis module 224 may calculate a frequency of the one or more data transmissions received from the specific source (e.g., five (5) data transmissions per minute).

The method 700 further includes determining whether the frequency is greater than an allowed anomalous data transmission frequency threshold, at 712. For example, referring to FIG. 2, the analysis module 224 may determine whether the frequency of the one or more data transmissions received from the specific source is greater than an allowed anomalous data transmission frequency threshold included in the policy 228. When it is determined that the frequency is less than the threshold, the method 700 ends at 718.

When it is determined that the frequency is greater than the allowed anomalous data transmission frequency threshold, the method 700 includes identifying an attack condition associated with the specific source, at 714. For example, referring to FIG. 2, the analysis module 224 may identify an attack condition (e.g., an ongoing network-based attack) associated with the specific source.

The method 700 also includes generating a security alert based on the identified attack condition, at 716. For example, referring to FIG. 2, the enforcement module 225 may generate the security alert 230 based on the analysis output 229, where the analysis output 229 indicates the attack condition identified by the analysis module 224. The method 700 ends at 718.

It will be appreciated the method 700 of FIG. 7 may be used to identify attack conditions on the basis of statistical analysis. For example, the method 700 of FIG. 7 may identify an ongoing network-based attack from a specific source even when individual data transmissions from the specific source are unrelated (e.g., not received continuously) and include anomalies within acceptable security parameters.

Figure 8:
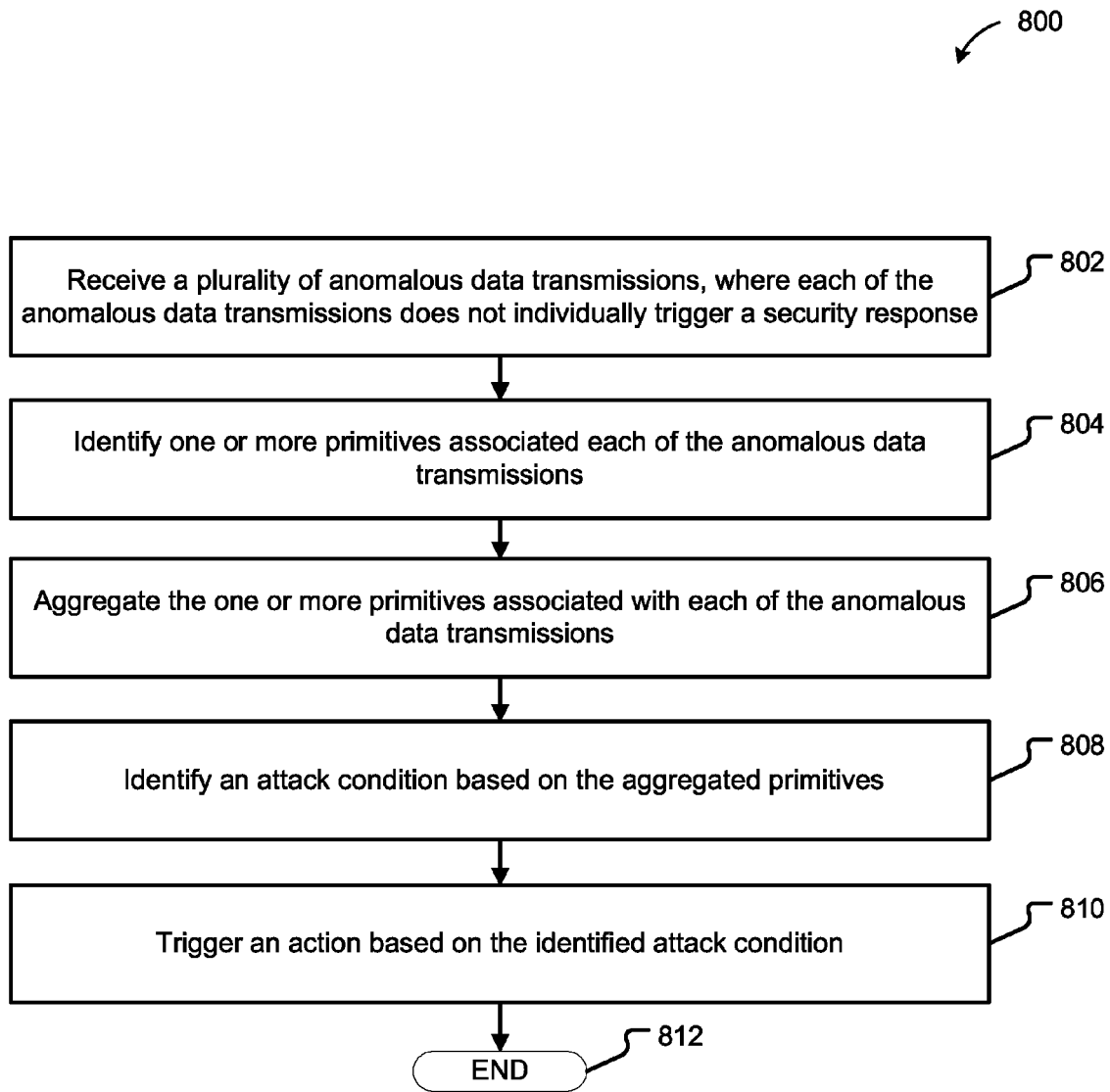
FIG. 8 is a flow diagram to illustrate another particular embodiment of a method of vulnerability detection.

FIG. 8 is a flow diagram to illustrate another particular embodiment of a method 800 of vulnerability detection. In an illustrative embodiment, the method 800 of FIG. 8 may be performed by the vulnerability detection system 120 of FIG. 1. In another illustrative embodiment, the method 800 of FIG. 8 may be performed by the host-based vulnerability detection system of FIG. 2, the distributed vulnerability detection system of FIG. 3, or the gateway-based vulnerability detection system of FIG. 4.

The method 800 includes receiving a plurality of anomalous data transmissions, at 802. Each of the anomalous data transmissions may not individually trigger a security response. For example, referring to FIG. 3, the client computer 320 may receive the data transmissions 310, where each of the data transmissions 310 includes an anomaly that does not individually trigger a security response.

The method 800 also includes identifying one or more primitives associated with each of the anomalous data transmissions, at 804. For example, referring to FIG. 3, the translation module 322 may translate the data transmissions 310 into the primitives 330.

The method 800 further includes aggregating the one or more primitives associated with each of the anomalous data transmissions, at 806. For example, referring to FIG. 3, the aggregation module 341 may aggregate the primitives 330 to form the aggregated primitives 344.

The method 800 includes identifying an attack condition based on the aggregated primitives, at 808. For example, referring to FIG. 3, the analysis module 342 may identify an attack condition based on the aggregated primitives 344.

The method 800 also includes triggering an action based on the identified attack condition, at 810. For example, referring to FIG. 3, the enforcement module 343 may take an action triggered by the analysis output 346, where the analysis output 346 indicates the attack condition identified by the analysis module 342. The method 800 ends at 812.

It will be appreciated that the method 800 of FIG. 8 may be used by a vulnerability detection system to trigger actions when an attack condition is identified. Examples of such actions include, but are not limited to, sending a security alert to client computers, changing the behavior of an IDS/IPS, changing the behavior of an application at a client computer, and blocking subsequent data transmissions from an identified source of the attack condition.

Figure 9:
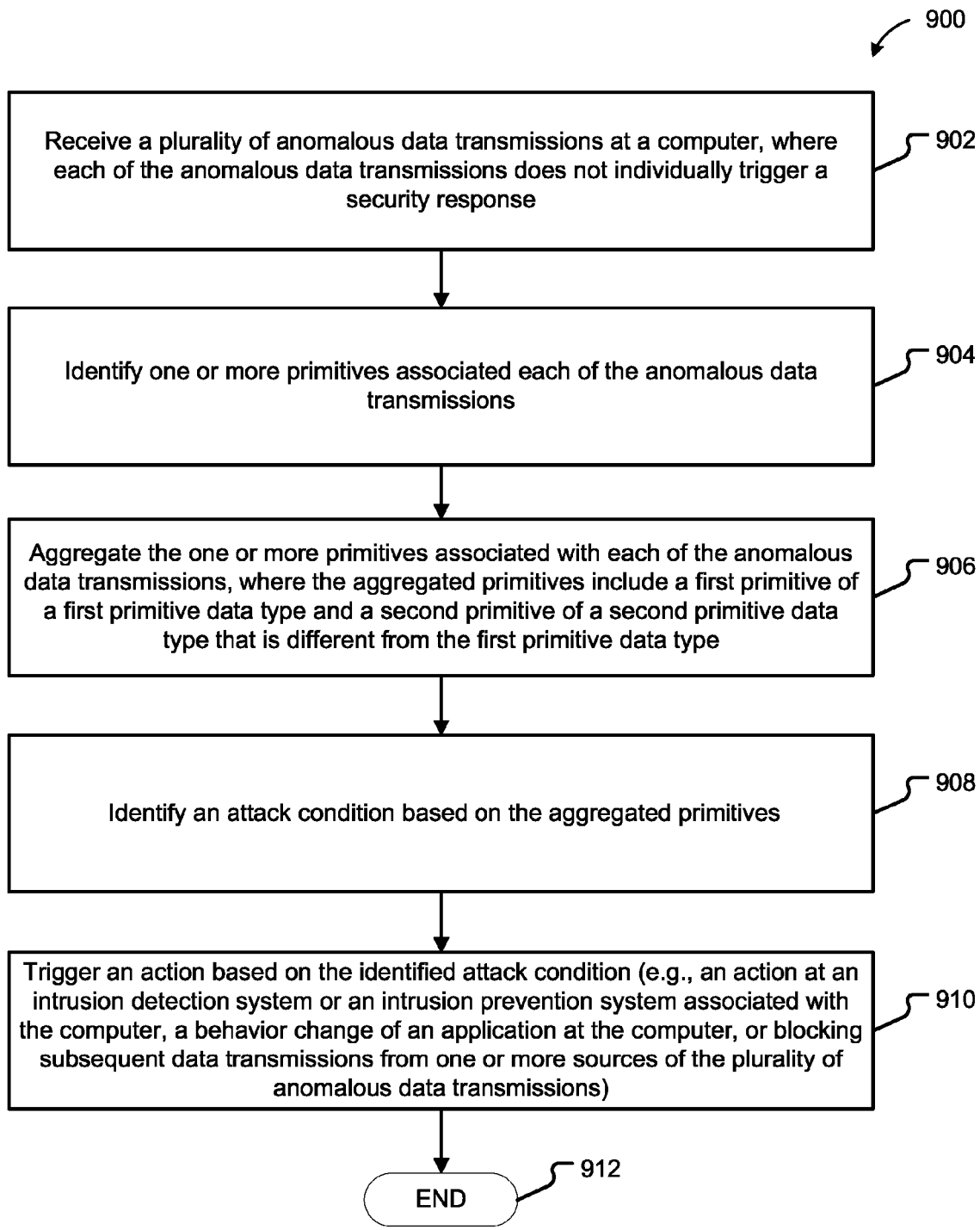
FIG. 9 is a flow diagram to illustrate another particular embodiment of a method of vulnerability detection.

FIG. 9 is a flow diagram to illustrate another particular embodiment of a method 900 of vulnerability detection. In an illustrative embodiment, the method 900 of FIG. 9 may be performed by the vulnerability detection system 120 of FIG. 1. In another illustrative embodiment, the method 900 of FIG. 9 may be performed by the host-based vulnerability detection system of FIG. 2, the distributed vulnerability detection system of FIG. 3, or the gateway-based vulnerability detection system of FIG. 4.

The method 900 includes receiving a plurality of anomalous data transmissions at a computer, at 902. Each of the anomalous data transmissions may not individually trigger a security response. For example, referring to FIG. 3, the client computer 320 may receive the data transmissions 310, where each of the data transmissions 310 includes an anomaly that does not individually trigger a security response.

The method 900 also includes identifying one or more primitives associated with each of the anomalous data transmissions, at 904. For example, referring to FIG. 3, the translation module 322 may translate the data transmissions 310 into the primitives 330.

The method 900 further includes aggregating the one or more primitives associated with each of the anomalous data transmissions, at 906. The aggregated primitives include a first primitive of a first primitive data type and a second primitive of a second primitive data type that is different from the first primitive data type. For example, referring to FIG. 3, the aggregation module 341 may aggregate the primitives 330 to form the aggregated primitives 344, where the aggregated primitives 344 include a first primitive of a first primitive data type and a second primitive of a second primitive data type that is different from the first primitive data type.

The method 900 includes identifying an attack condition based on the aggregated primitives, at 908. For example, referring FIG. 3, the analysis module 342 may identify an attack condition based on the aggregated primitives 344.

The method 900 also includes triggering an action based on the identified attack condition, at 910. The action may be an action at an IDS or IPS associated with the computer, a behavior change of an application at the computer, or blocking subsequent data transmissions from one of more sources of the plurality of anomalous data transmissions. For example, referring FIG. 3, an action may be triggered based on the analysis output 346, where the analysis output 346 indicates the attack condition identified by the analysis module 342. The method 900 ends at 912.

It will be appreciated that the method 900 of FIG. 9 may enable the detection of vulnerabilities based on aggregated primitives even when all of the primitives are not of the same type. For example, the method 900 of FIG. 9 may enable the detection of vulnerabilities based on a combination of different low-level language primitives (e.g., a string and a floating-point number), a combination of different high-level typed primitives (e.g., a vector and a user-defined class), or a combination of different low-level primitives and different high-level primitives (e.g., a string, an integer, a hash, and an array).

Figure 10:
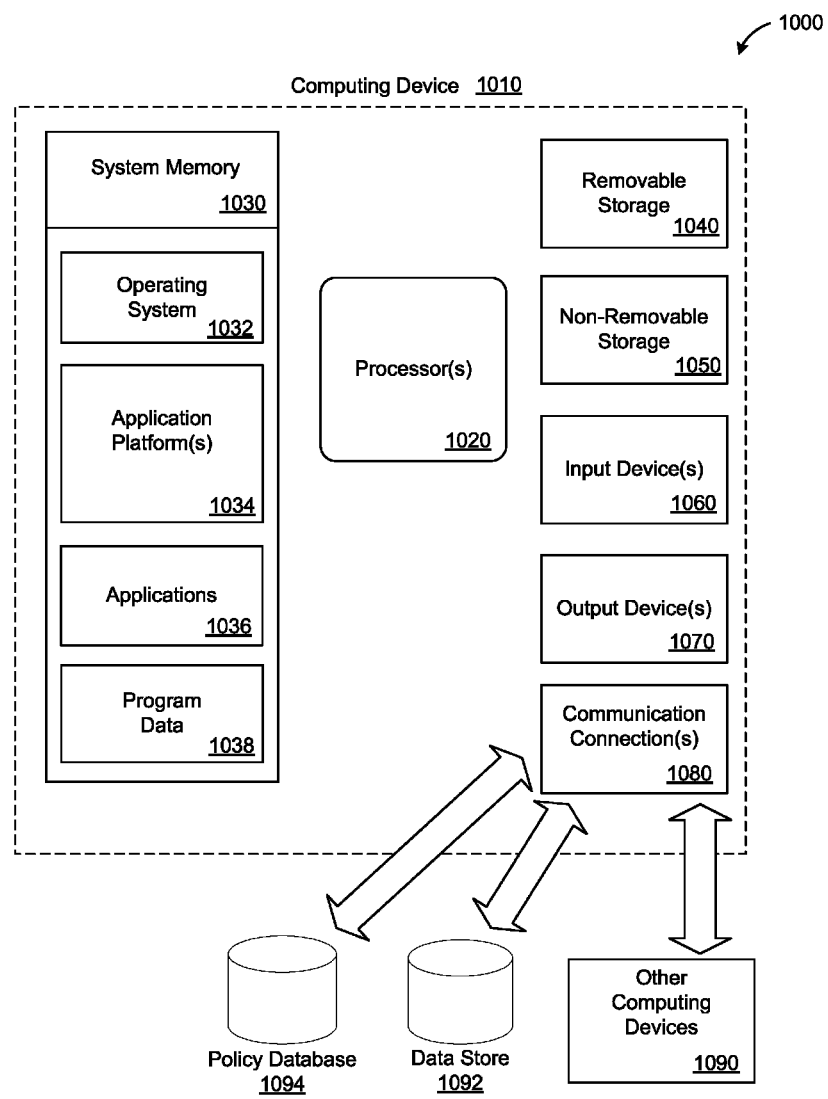
FIG. 10 is a block diagram of a computing environment including a computing device operable to support embodiments of computer-implemented methods, computer program products, and system components as illustrated in FIGS. 1-9.

FIG. 10 shows a block diagram of a computing environment 1000 including a computing device 1010 operable to support embodiments of computer-implemented methods, computer program products, and system components according to the present disclosure. In an illustrative embodiment, the computing device 1010 may include the vulnerability detection system 120 of FIG. 1, the client computer 220 of FIG. 2, or the client computer 320 of FIG. 3. In another illustrative embodiment, the computing device 1010 may include the IDS/IPS 340 of FIG. 3 or the IDS/IPS 440 of FIG. 4. In another particular embodiment, the computing device 1010 may include the firewall 430 of FIG. 4.

The computing device 1010 typically includes at least one processor 1020 and system memory 1030. Depending on the configuration and type of computing device, the system memory 1030 may be volatile (such as random access memory or "RAM"), non-volatile (such as read-only memory or "ROM," flash memory, and similar memory devices that maintain stored data even when power is not provided) or some combination of the two. The system memory 1030 typically includes an operating system 1032, one or more application platforms 1034, one or more applications 1036, and may include program data 1038. In an illustrative embodiment, the system memory 1030 may include one or more units, engines, controllers, or modules as disclosed herein. For example, with reference to FIG. 1, the system memory 1030 of FIG. 10 may include one or more of the units 122, 124, 127 or 129, the engine 130, and the controller 126. As another example, with reference to FIG. 2, the system memory 1030 of FIG. 10 may include one or more of the modules 222, 223, 224, or 225. As another example, with reference to FIG. 3, the system memory 1030 of FIG. 10 may include one or more of the modules 322, 341, 342, or 343. As another example, with reference to FIG. 4, the system memory 1030 of FIG. 10 may include one or more of the modules 441, 442, 443, or 444.

The computing device 1010 may also have additional features or functionality. For example, the computing device 1010 may also include removable and/or non-removable additional data storage devices such as magnetic disks, optical disks, tape, and standard-sized or miniature flash memory cards. Such additional storage is illustrated in FIG. 10 by removable storage 1040 and non-removable storage 1050. Computer storage media may include volatile and/or non-volatile storage and removable and/or non-removable media implemented in any method or technology for storage of information such as computer-readable instructions, data structures, program components or other data. The system memory 1030, the removable storage 1040 and the non-removable storage 1050 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store information and which can be accessed by computing device 1010. Any such computer storage media may be part of the computing device 1010. The computing device 1010 may also have input device(s) 1060, such as a keyboard, mouse, pen, voice input device, touch input device, etc. Output device(s) 1070, such as a display, speakers, printer, etc. may also be included.

The computing device 1010 also contains one or more communication connections 1080 that allow the computing device 1010 to communicate with other computing devices 1090 over a wired or a wireless network. In an illustrative embodiment, the communication connections 1080 include the interface 121 of FIG. 1, the network interface 221, of FIG. 2, the network interface 321 of FIG. 3, or the network interface of the firewall 430 of FIG. 4. In another illustrative embodiment, when the computing device 1010 is used as the client computer 320 of FIG. 3 or the firewall 430 of FIG. 4, the other computing devices 1090 may include the IDS/IPS 340 of FIG. 3 or the IDS/IPS 440 of FIG. 4. When the computing device 1010 is used as an IDS/IPS such as the IDS/IPS 340 of FIG. 3 or the IDS/IPS 440 of FIG. 4, the computing device 1010 may also communicate with a data store 1092 and a policy database 1094. In an illustrative embodiment, the data store 1092 is the data store 450 of FIG. 4 and the policy database 1094 is the policy database 460 of FIG. 4.

The one or more communication connections 1080 are an example of communication media. By way of example, and not limitation, communication media may include wired media such as a wired network or direct-wired connection, and wireless media, such as acoustic, radio frequency (RF), infrared and other wireless media. It will be appreciated, however, that not all of the components or devices illustrated in FIG. 10 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. To clearly illustrate this interchangeability of hardware and software, various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable any person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer based vulnerability detection system comprising:
    an interface of a computer configured to receive a plurality of network messages, each of the plurality of network messages including a network message payload;
    a translation module of the computer executable by the computer to translate each of the network message payloads into one or more primitives;
    an aggregation module of the computer configured to aggregate each of the network message payloads, including aggregating primitives of a first primitive data type and primitives of a second primitive data type, wherein the first primitive data type and the second primitive data type are different primitive data types, to produce aggregated primitives;
    an analysis module of the computer configured to generate an analysis output
        upon identifying a match between the aggregated primitives and a policy, wherein a difference between a first value in the aggregated primitives and a second value in the aggregated primitives is identified by the policy as an indication of a threat, wherein the first value is associated with a first primitive corresponding to a first network message payload and wherein the second value is associated with a second primitive corresponding to a second network message payload; and
    an enforcement module configured to generate a security alert based on the analysis output.

2. The system of claim 1, wherein the first value and the second value are stored as double words, and wherein the second value being larger than the first value is identified by the policy as an indication of the threat.

3. The system of claim 1, wherein the security alert is sent to an intermediary device.

4. The system of claim 1, wherein the analysis module is located at or coupled to an intrusion prevention system or an intrusion detection system.

5. The system of claim 1, wherein the first message payload, the second message payload, and the one or more primitives are stored at a data store, and wherein the aggregation module is further configured to retrieve the first message payload, the second message payload, and the one or more primitives from the data store.

6. The system of claim 1, wherein the policy is retrieved from a policy database, wherein the policy is expressed in a meta language, and wherein the policy is a rule based policy that does not include information defining a known malware, a known security exploit, or a known vulnerable data structure.

7. The system of claim 6, wherein the meta language includes an extensible markup language (XML), a binary representation, a generic application level protocol analyzer language (GAPAL), or any combination thereof.

8. A method comprising:
    receiving a plurality of network messages including a first network message including a first payload and a second network message including a second payload, wherein the first payload includes a first protocol anomaly and the second payload includes a second protocol anomaly wherein the first protocol anomaly and the second protocol anomaly are not individually indicative of a security threat;
    identifying a plurality of primitives by translating the first payload and the second payload into primitives, wherein the primitives include primitives of a first primitive data type and primitives of a second primitive data type, wherein the first primitive data type and the second primitive data type are different primitive data types;
    aggregating the identified plurality of primitives to produce aggregated primitives, the aggregated primitives including a first primitive translated from the first protocol anomaly and a second primitive translated from the second protocol anomaly, wherein the first primitive corresponds to a first value and the second primitive corresponds to a second value, and wherein the second value being different than the first value indicates an attack condition; and
    generating a security alert based on the indicated attack condition.

9. The method of claim 8, wherein the protocol anomalies include at least one of a data structure overflow, a missing expected data structure, an invalid data value, an improper sequence of numbers, an out of order message, a name mismatch, or any combination thereof.

10. The method of claim 8, wherein the plurality of primitives includes a low-level language primitive or a high-level typed primitive.

11. The method of claim 8, wherein the attack condition is identified further based on a match between the aggregated primitives and a policy, wherein the policy does not rely upon information defining a known malware, a known security exploit, or a known vulnerable data structure.

12. The method of claim 8, further comprising determining an identity of a specific source of one or more of the plurality of network messages.

13. The method of claim 12, wherein identifying the attack condition includes calculating a frequency of anomalous data transmissions from the specific source and determining that the frequency is greater than an allowed anomalous data transmission frequency threshold.

14. The method of claim 8, wherein generating the security alert includes generating an event of an event-based alert system or generating a synchronous security notification.

15. A computer-readable storage device comprising instructions, that when executed by a computer, cause the computer to:

receive a plurality of network message payloads, the network message payloads from anomalous data transmissions, wherein each of the anomalous data transmissions does not individually trigger a security response;

translate the plurality of network message payloads into a plurality of primitives including primitives of a first primitive data type and primitives of a second primitive data type, wherein the first primitive data type and the second primitive data type are different primitive data types;

aggregate the plurality of primitives;

identify an attack condition based on the aggregated plurality of primitives; and trigger an action based on the identified attack condition, wherein the aggregated plurality of primitives includes a first primitive translated from a first network message payload and a second primitive translated from a second network message payload, wherein the first primitive corresponds to a first value, wherein the second primitive corresponds to a second value, and wherein the second value differing from the first value indicates malicious activity.

16. The computer-readable storage device of claim 15, wherein the action occurs at an intrusion detection system associated with the computer or at an intrusion prevention system associated with the computer.

17. The computer-readable storage device of claim 15, wherein the action includes a behavior change of an application at the computer.

18. The computer-readable storage device of claim 15, wherein the action includes blocking subsequent data transmissions from one or more sources of the plurality of network message payloads.

19. The computer-readable storage device of claim 15, wherein the first primitive is converted to a first double word corresponding to the first value and the second primitive is converted to a second double word corresponding to the second value, wherein the second value exceeding the first value indicates a security threat, and wherein each of the values individually does not indicate the security threat.

20. The system of claim 6, wherein the policy database is updatable independently from an intrusion detection system.

\* \* \* \* \*